United States Patent
Balus et al.

(10) Patent No.: US 7,782,763 B2
(45) Date of Patent: Aug. 24, 2010

(54) FAILURE PROTECTION IN A PROVIDER BACKBONE BRIDGE NETWORK USING FORCED MAC FLUSHING

(75) Inventors: Florin Balus, Cupertino, CA (US);
Kendall William Harvey, Sunnyvale, CA (US); Joe Regan, Pleasanton, CA (US); Paul Kwok, Mountain View, CA (US)

(73) Assignee: Alcatel Lucent, Paris (FR)

( * ) Notice: Subject to any disclaimer, the term of this patent is extended or adjusted under 35 U.S.C. 154(b) by 259 days.

(21) Appl. No.: 11/972,139

(22) Filed: Jan. 10, 2008

(65) Prior Publication Data
US 2008/0225695 A1 Sep. 18, 2008

Related U.S. Application Data

(60) Provisional application No. 60/894,674, filed on Mar. 13, 2007.

(51) Int. Cl.
H04L 12/26 (2006.01)
H04L 12/28 (2006.01)
H04L 12/56 (2006.01)
H04J 3/14 (2006.01)

(52) U.S. Cl. ............... 370/218; 370/242; 370/245; 370/401; 709/221; 709/239; 709/242

(58) Field of Classification Search ............... 370/216, 370/217, 218, 225, 241.1, 242, 244, 245, 370/248, 256, 401; 709/221, 239, 242
See application file for complete search history.

(56) References Cited

U.S. PATENT DOCUMENTS

| 2007/0076719 A1* | 4/2007 | Allan et al. | 370/392 |
| 2007/0086361 A1* | 4/2007 | Allan et al. | 370/254 |
| 2008/0049764 A1* | 2/2008 | Solomon et al. | 370/401 |
| 2008/0144644 A1* | 6/2008 | Allan et al. | 370/401 |
| 2008/0228943 A1* | 9/2008 | Balus et al. | 709/239 |
| 2009/0109848 A1* | 4/2009 | Hato et al. | 370/235 |

OTHER PUBLICATIONS

Pranjal Kumar Dutta et al.; "LDP Extensions for Optimized MAC Address Withdrawal in H-VPLS draft-pdutta-l2vpn-vpls-Idp-mac-opt-02.txt", Mar. 3, 2007, p. 1-12.
Sajassi, et al.; "VPLS Interoperability with Provider Backbone Bridges draft-sajassi-l2vpn-vpls-pbb-interop-00.txt", Mar. 2007, p. 1-20.

\* cited by examiner

*Primary Examiner*—Chi H Pham
*Assistant Examiner*—Ahmed Elallam
(74) *Attorney, Agent, or Firm*—Wilson & Ham

(57) ABSTRACT

A technique for operating a network involves controlling the black-holing of traffic by forcing customer source MAC address (CMAC)-to-backbone source MAC address (BMAC) associations at provider backbone bridge (PBB) provider edge (PE) devices to be flushed from their corresponding forwarding information bases (FIBs) in response to a service failure so that new CMAC-to-BMAC associations, which are reflective of a secondary traffic path, are learned faster than they would otherwise be learned if the network had relied on native functionality to learn new CMAC-to-BMAC associations that are reflective of the secondary traffic path.

20 Claims, 8 Drawing Sheets

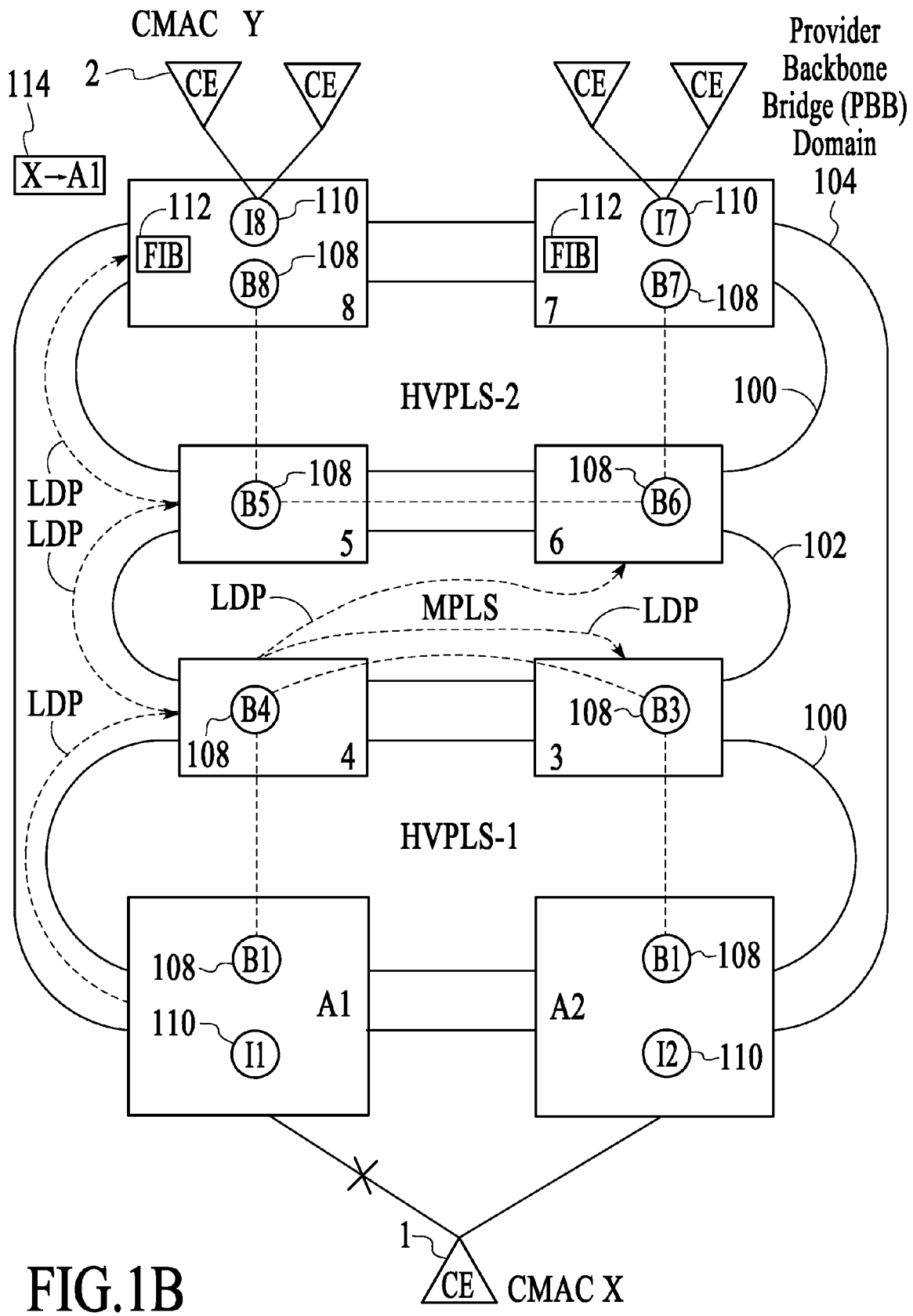

FAILURE PROTECTION IN A PROVIDER BACKBONE BRIDGE NETWORK USING FORCED MAC FLUSHING

CROSS-REFERENCE TO RELATED APPLICATION

This application is entitled to the benefit of provisional Patent Application Ser. No. 60/894,674, filed 13 Mar. 2007.

FIELD OF THE INVENTION

The invention relates generally to network management, and more particularly, to providing failure protection in a network that utilizes provider backbone bridging (PBB).

BACKGROUND OF THE INVENTION

Provider backbone bridging or provider backbone bridges (PBB) is an Ethernet-based technology that enables the layering of a network into customer and provider domains with complete isolation between customer and provider MAC addresses. This technology is currently being formalized as an IEEE standard identified as IEEE 802.1ah. Provider backbone bridging is implemented between provider edge (PE) devices by adding a provider backbone header that includes a backbone source address (B-SA), a backbone destination address (B-DA), a backbone VLAN ID (B-VID), and a service instance VLAN ID (I-VID). Within a provider backbone bridging domain, packets are forwarded based on media access control (MAC) learning, loop avoidance is accomplished through Spanning Tree Protocol (STP), and B-VIDs are used for broadcast containment.

At the edges of a provider backbone bridging domain (e.g., at the PBB PE devices), forwarding information bases (FIBs) are populated with customer source MAC address (CMAC) and backbone source MAC address (BMAC) associations which are obtained through MAC address learning. In particular, a customer packet with a customer source address that enters the provider backbone bridging domain at a first PBB PE device is mapped to a backbone source MAC address, which is the source MAC address of the PBB PE device at which the packet entered the provider backbone bridging domain.

In order to provide failure protection between customer and provider domains, a customer edge (CE) device may be linked to two different PBB PE devices, a practice referred to as "dual-homing." When a CE device is dual-homed, other PBB PE devices in the PBB domain will learn CMAC-to-BMAC associations for whichever link is being used to send traffic between the CE device and the two PBB PE devices to which the CE device is connected. As long as the link between the PBB PE device and the CE device is active, the learned CMAC-to-BMAC associations at the other PBB PE devices are valid and customer traffic will be successfully switched across the PBB domain to the target CE device.

However, if the link between the active PBB PE device and the target CE device fails or the active PBB PE itself fails, CMAC-to-BMAC associations learned at the other PBB PE devices will cause traffic to be sent to the target CE device via the failed link and/or the failed PBB PE device. Traffic that is sent to the target CE device via the failed link or the failed PBB PE device will not make it to the CE device and will eventually be lost without the knowledge of the sending PBB PE device at the other end of the PBB domain. This loss of traffic, often referred to as "black-holing," will continue until the CMAC-to-BMAC associations are aged out of the FIBs at the respective PBB PE devices or until a new packet is sent from the CE device with the same CMAC such that a new CMAC-to-BMAC association can be learned through the native Ethernet learning process. Relying on aging or the transmission of a new packet to trigger a new CMAC-to-BMAC association may result in noticeable disruptions to the customer, especially with regard to time-sensitive applications such as real-time voice and streaming video.

SUMMARY OF THE INVENTION

A technique for operating a network involves controlling the black-holing of traffic by forcing CMAC-to-BMAC associations at PBB PE devices to be flushed from their corresponding FIBs in response to a service failure so that new CMAC-to-BMAC associations, which are reflective of a secondary traffic path, are learned faster than they would otherwise be learned if the network had relied on native functionality to learn new CMAC-to-BMAC associations that are reflective of the secondary traffic path.

In an embodiment, a method for operating a network that utilizes provider backbone bridging to create a PBB domain is disclosed. The network includes a first CE device connected to first and second PBB PE devices and a second CE device connected to a third PBB PE device. The method involves, at the third PBB PE device, learning CMAC-to-BMAC associations that map a CMAC from a customer domain to a BMAC of the first PBB PE device, detecting a service failure that requires a path change for customer traffic to reach the first CE device from the second CE device, and triggering a flush of the CMAC-to-BMAC associations at the third PBB PE device in response to the detected service failure. Because the CMAC-to-BMAC associations are flushed from the third PBB PE device in response to the detected service failure, new CMAC-to-BMAC associations are installed faster than they otherwise would have been had aging and/or waiting for a new packet with the same CMAC to be sent were relied upon to trigger the learning of new CMAC-to-BMAC associations at the third PBB PE device. Depending on the network topology, flushing of the CMAC-to-BMAC associations is triggered using Label Distribution Protocol (LDP) messaging or using a combination of Spanning Tree Protocol (STP) Topology Change Notification (TCN) messaging and LDP messaging.

In another embodiment, a network device is disclosed. The network device is used in a network that utilizes PBB to create a PBB domain, wherein the network includes a first CE device connected to first and second PBB PE devices and a second CE device connected to a third PBB PE device. The network device is configured to detect a service failure that requires a path change for customer traffic to reach the first CE device from the second CE device and to trigger a flush of CMAC-to-BMAC associations learned at the third PBB PE device in response to the detected service failure.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 1A-1C illustrate a technique for controlling black-holing in a network topology in which CE devices are connected by Hierarchical Virtual Private LAN Services (HV-PLS) in the metropolitan area network (MAN) and by multiprotocol label switching (MPLS) in the wide area network (WAN).

Throughout the description, similar reference numbers may be used to identify similar elements.

DETAILED DESCRIPTION

Provider backbone bridging or provider backbone bridges, both referred to herein as "PBB," can be applied to various different network topologies. One topology that is employed by service providers involves using multiprotocol label switching (MPLS) from end-to-end within a PBB domain. Another topology employed by service providers involves utilizing provider backbone bridging in the metropolitan area network (MAN) and MPLS in the wide area network (WAN). In both cases, provider backbone bridging enables customer MAC addresses (CMACs) to be hidden from the service provider domain while backbone MAC addresses (BMACs) are used to forward traffic within the PBB domain. In order to translate between CMACs and BMACs, CMAC-to-BMAC learning occurs at the edges of the PBB domain, i.e., at PBB PE devices, and corresponding forwarding information bases (FIBs) are populated with the learned CMAC-to-BMAC associations. When customer traffic is sent through the PBB domain, CMAC-to-BMAC translations are performed at the interface between the customer and service provider domains using the FIBs that are populated with the CMAC-to-BMAC associations.

As described above, dual-homing is often used to provide failure protection between the customer and provider domains. In a dual-homed configuration, a customer edge (CE) device is linked to two different PBB PE devices and the dual-homing can lead to the black-holing of traffic when the link between the primary PBB PE device and the CE device fails or when the primary PBB PE device itself fails.

In accordance with an embodiment of the invention, the black-holing of traffic is controlled by forcing CMAC-to-BMAC associations at the PBB PE devices to be flushed from the corresponding FIBs so that new CMAC-to-BMAC associations, which are reflective of the secondary traffic path, are installed faster than they would have been had the network relied on native functionality such as aging and/or transmission of a new packet from the customer (with the same customer source MAC address) through the secondary PBB PE device.

As described above, two network topologies in which provider backbone bridging is used by service providers include an MPLS end-to-end topology and a combination PBB and MPLS topology. The different network topologies employ different operating principals which in turn effect how CMAC-to-BMAC flushing can be triggered. A technique for triggering CMAC-to-BMAC flushing in a network topology that utilizes end-to-end MPLS is described with reference to FIGS. 1A-1C and a technique for triggering CMAC-to-BMAC flushing in a network topology that utilizes a combination of PBB and MPLS is described with reference to FIGS. 2A-2C.

Figure 1A:
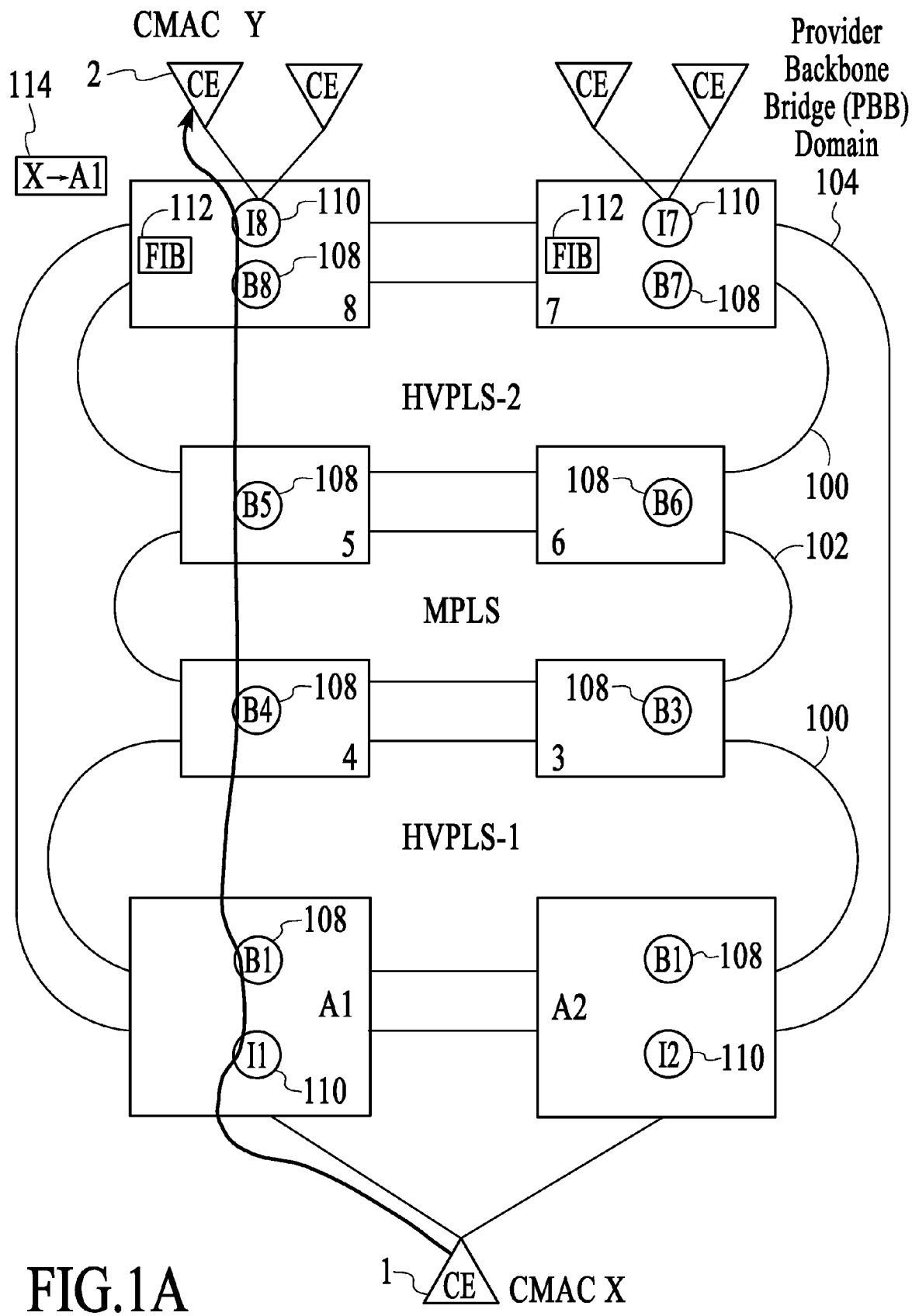

FIG. 1A depicts a network topology in which CE devices are connected by Hierarchical Virtual Private LAN Services (HVPLS) in the MAN 100 and by MPLS in the WAN 102. PBB is run within the HVPLS and MPLS domains to create a PBB domain 104 that isolates the CMACs from any devices that are within the core of the PBB domain. In FIG. 1A, only PE devices are shown. In particular, HVPLS domain 1 includes PE devices A1, A2, 3, and 4, the MPLS domain includes PE devices 3, 4, 5, and 6, and HVPLS domain 2 includes PE devices 5, 6, 7, and 8. Although devices A1-8 are all PE devices with respect to their corresponding MAN and/or WAN, only PE devices A1, A2, 7, and 8 are PE devices with respect to the PBB domain. PE devices that are edge devices with respect to the PBB domain are referred to herein as "PBB PE devices." PBB PE devices may also be referred to as Backbone Edge Bridges (BEBs) in the developing IEEE 802.1ah standard, see for example, IEEE P802.1ah Draft 3.4, dated Mar. 10, 2007, which is incorporated by reference herein. The PBB PE devices perform CMAC-to-BMAC learning and populate their FIBs 112 with the learned CMAC-to-BMAC 114 associations. Each PBB PE device includes a backbone component 108 that faces the PBB domain and is backbone MAC address based and a customer component 110 that faces the customer domain and is customer MAC address based. In an embodiment, the customer component and the backbone component of the PE devices are embodied as software objects.

In an exemplary operation, a packet from CE device 1 has a customer source MAC address X and a customer destination MAC address Y. Once the packet travels through the PBB domain to the target CE device, the customer source MAC address is associated with the backbone source MAC address of the device through which the packet entered the PBB domain. This "CMAC-to-BMAC association" is installed into the FIB at the corresponding PBB PE device. For example, referring to FIG. 1A, if a customer packet travels from CE device 1 to CE device 2 through PBB PE device A1, then PBB PE device 8 learns that customer source MAC address X (CMAC X) is associated with backbone source MAC address A1 (BMAC A1), that is, PBB PE device 8 learns the CMAC-to-BMAC association 114 of X→A1. Once the CMAC-to-BMAC association is learned at PBB PE device 8, all customer traffic from CE device 2 destined for CMAC X is sent through the PBB domain via BMAC A1. As long as PBB PE device A1 is active and the link between PBB PE A1 and CE device 1 is active, traffic destined to CMAC X from PBB PE device 8 will be successfully delivered to CE device 1. However, if the link between PE device A1 and CE device 1 fails or PBB PE device A1 itself fails, traffic forwarded from PBB PE device 8 to CE device 1 via PBB PE A1 will likely be black-holed.

In accordance with an embodiment of the invention, black-holing is controlled in the event of a service failure by using the Label Distribution Protocol (LDP) to trigger the flushing of the CMAC-to-BMAC associations at the PBB PE devices, where the flushing of a CMAC-to-BMAC association involves removing the learned association from a table such as an FIB without having a replacement association. That is, in MAC learning an existing MAC association is immediately replaced with a newly learned MAC association while a flushing operation removes an existing MAC association from the FIB without providing a new MAC association. FIG. 1B depicts the network of FIG. 1A in the case where a failure occurs in the link between PBB PE device A1 and CE device 1. In response to detecting the link failure between PBB PE device A1 and CE device 1, PBB PE device A1 sends out an LDP MAC withdraw message indicating BMAC A1. All PE devices that receive the LDP MAC withdraw message flush MAC A1 entries from their FIBs and forward the LDP MAC withdraw message to their neighbor PE devices. The distribution of the LDP MAC withdraw messages throughout the MPLS and HVPLS domains causes the MAC A1 entries to be flushed from the backbone components 108 at every PE device within the PBB domain. In an embodiment, the PE devices that participate in the mesh apply split horizon (mesh-to-mesh forwarding of the LDP MAC withdraw message) to avoid loops.

All customer components 110 of the PBB PE devices also flush any CMAC-to-BMAC A1 associations in response to the LDP MAC withdraw messages. Once the CMAC-to-BMAC A1 entries are flushed from the FIBs of the PBB PE devices, new associations that identify PBB PE device A2 are learned and installed at the PBB PE device. Because the CMAC-to-BMAC associations are flushed from the PBB PE devices, new CMAC-to-BMAC associations must be learned on the next packet after the flush occurs. The CMAC-to-BMAC associations will be learned by flooding or in response to receiving a new packet from CMAC X (e.g., via PBB PE device A2). Packets originating from CE device 2 will continue to be flooded until the new CMAC-to-BMAC association is learned and installed in the FIB 112 of the corresponding PBB PE device (e.g., PBB PE device 8). The forced MAC flushing ensures that no more packets are black-holed once the flush occurs.

Although the above-described technique works well to ensure that CMAC-to-BMAC entries identifying BMAC A1 are flushed from the FIBs, the technique is non-discriminate in its flushing. That is, entries identifying BMAC A1 are flushed from each PE device in the PBB domain regardless of whether the device is a PBB PE or a core PE (i.e., a PE that is not at the edge of the PBB domain). In an embodiment, all I-VPLS domains are flushed. An enhancement to the above-described technique involves using a newly defined LDP Type-Length-Value (TLV) element, referred to as a "PBB TLV," to form an extended LDP MAC withdraw message. The PBB TLV in the extended LDP MAC withdraw message is used to avoid the flushing of BMAC A1 from the backbone VPLS FIBs and to trigger, at the PBB PE devices, the flushing of the CMAC-to-BMAC A1 entries only for specific customer VPNs. In an embodiment, the enhanced technique involves:

1) Upon detection of a link failure, PBB PE A1 constructs an extended LDP MAC withdraw message that includes a PBB TLV containing one or more BMACs (e.g. A1) and one or more specific I-SIDs in separate subTLVs 2) The extended LDP MAC withdraw message with the PBB TLV is sent to neighbor devices of PBB PE A1.

3) If the neighbor devices are only B-VPLS PE devices (Backbone Core Bridges in IEEE terminology and not PBB PE devices) for the I-SIDs listed in the related subTLV, the neighbor devices do not perform any flushing.

4) If the neighbor devices are PBB PE devices for the I-SID in the received subTLV, then the neighbor devices flush all the entries in their customer FIBs that are pointed to the BMAC(s) listed in the BMAC subTLV.

Whether the PE devices are B-VPLS PE devices or PBB PE devices, the neighbor devices continue to forward the extended LDP MAC withdraw messages with the PBB TLV to their neighbor devices while applying split horizon rules (no mesh-to-mesh forwarding). Using an extended LDP MAC withdraw message with a PBB TLV allows for selective flushing that can reduce the learning burden on the network.

Figure 1C:
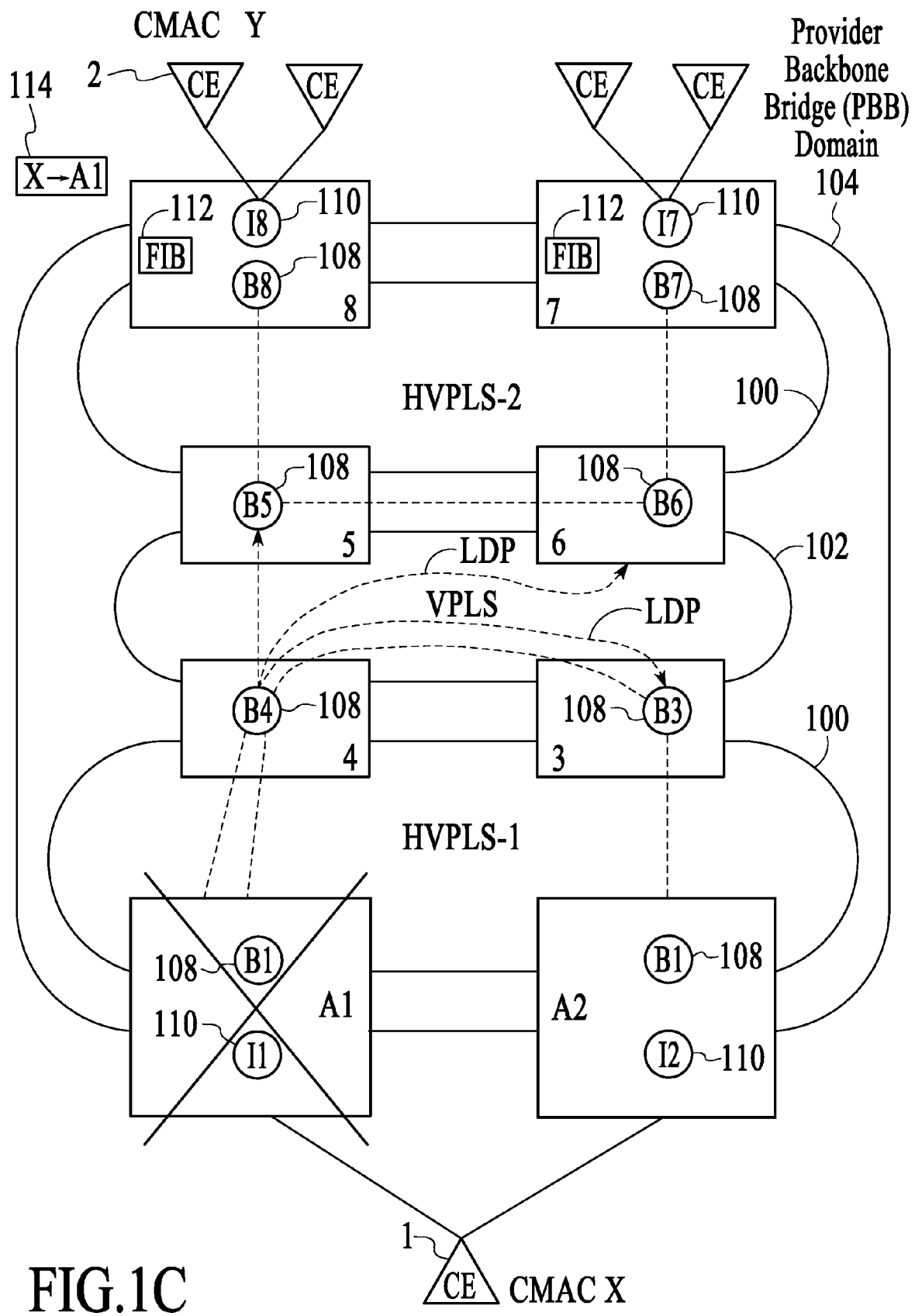

The technique described above with reference to FIG. 1B is also applicable to a PE device failure instead of a link failure. FIG. 1C depicts the network of FIG. 1A in the case where a failure of the entire PBB PE device occurs. For example, when PBB PE device A1 fails, PE device 4 will learn of the device failure through LDP. Specifically, the lack of LDP messages from PBB PE device A1 will indicate a device failure. In response to the failure of PBB PE device A1, PE device 4 will send LDP MAC withdraw messages to the MPLS domain and to PBB PE A2 via PE device 3. PE devices 5 and 6 will send LDP MAC withdraw messages to their MTUs, which are also the PBB PE devices 7 and 8 in the network of FIG. 1C. The PBB PE devices 7 and 8 flush all CMAC-to-BMAC A1 associations in response to the LDP MAC withdraw message. Flushing of the CMAC-to-BMAC associations at PBB PE devices 7 and 8 causes PBB PE devices 7 and 8 to learn new CMAC-to-BMAC associations, which will include BMAC A2 instead of BMAC A1.

As described above, an enhancement to the LDP-based technique introduces BMAC A1 in an enhanced LDP MAC withdraw message that includes a PBB TLV. In another embodiment, BMACs (e.g., A1) to be flushed are provisioned or learned from LDP exchanges between PBB PE device A1 and PE device 4. In another embodiment, PBB PE device A2 synchronizes with PBB PE device A1, including sharing CMAC-to-BMAC associations, and can perform appropriate LDP MAC withdraw messaging for PBB PE device A1 BMACs in the event of a node failure.

Figure 2A:
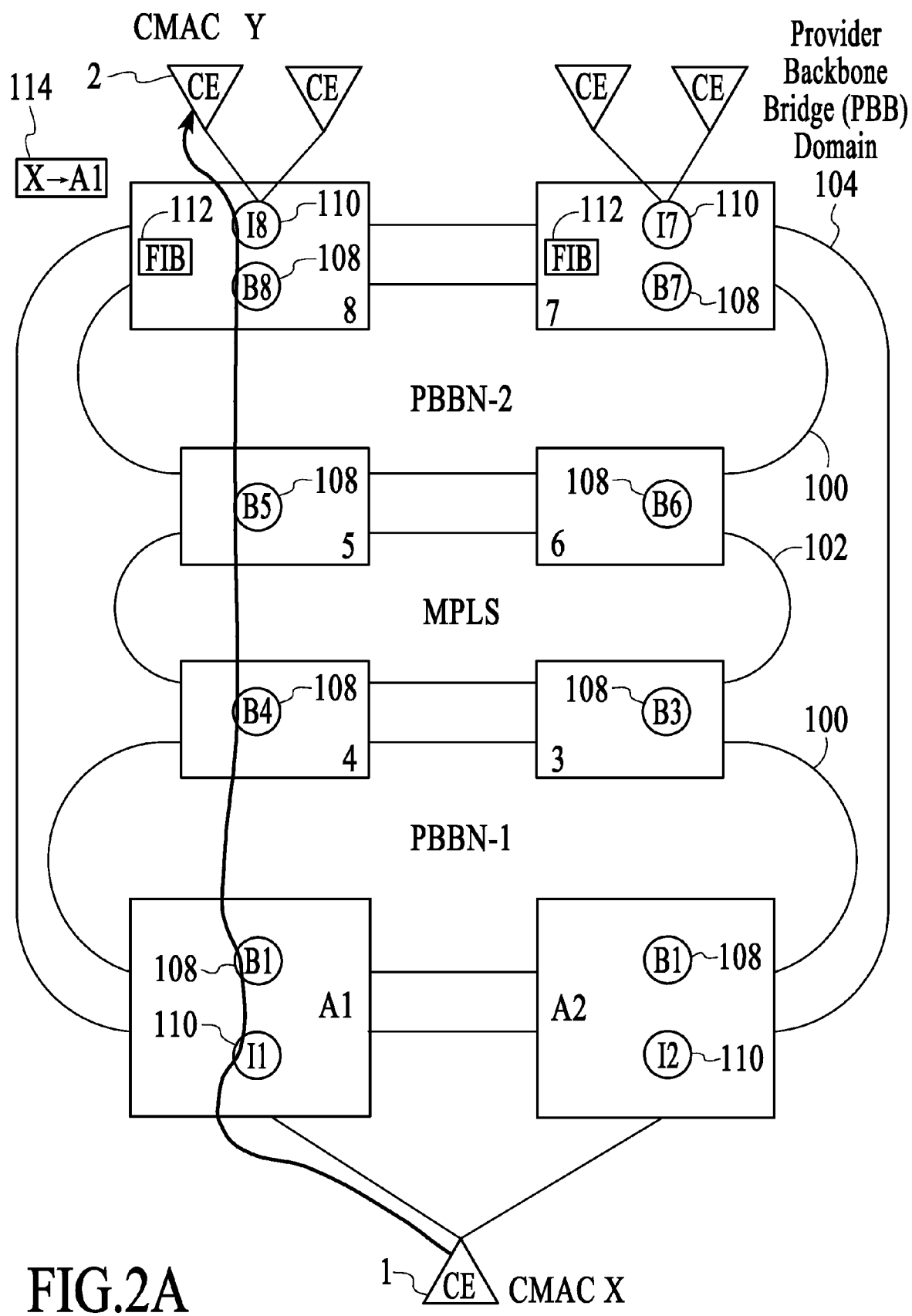
FIGS. 2A-2C illustrate a technique for controlling blackholing in a network topology in which CE devices are connected by PBB in the MAN and by MPLS in the WAN.

FIG. 2A depicts a network topology in which CE devices are connected by PBB in the MAN and by MPLS in the WAN. PBB is run within the local PBB domains (local PBB domains 1 and 2) and the MPLS domain to create a PBB domain that isolates the CMACs from any devices that are within the core of the PBB domain. In FIG. 2A, only PE devices are shown. In particular, PBB domain 1 includes PE devices A1, A2, 3, and 4, the MPLS domain includes PE devices 3, 4, 5, and 6, and PBB domain 2 includes PE devices 5, 6, 7, and 8. Although devices A1-8 are all PE devices with respect to their corresponding MAN and/or WAN, only PE devices A1, A2, 7, and 8 are PBB PE devices with respect to the PBB domain. As described above, the PBB PE devices perform CMAC-to-BMAC learning and populate their FIBs with the learned CMAC-to-BMAC associations. Each PBB PE device includes a backbone component that faces the PBB domain and is BMAC based and a customer component that faces the customer domain and is CMAC based. In an exemplary operation, a packet from CE device 1 has a customer source MAC address X and a customer destination MAC address Y. Once the packet travels through the PBB domain to the target CE device, the customer source MAC address is associated with the backbone source MAC address of the device through which the packet entered the PBB domain. This CMAC-to-BMAC association is installed into the FIB at the corresponding PBB PE device. For example, referring to FIG. 2A, if a customer packet travels from CE device 1 to CE device 2 through PBB PE device A1, then PBB PE device 8 learns that customer source MAC address X (CMAC X) is associated with backbone source MAC address A1 (BMAC A1), that is, PBB PE device 8 learns the CMAC-to-BMAC association 114 of X→A1. Once the CMAC-to-BMAC association is learned at PBB PE device 8, all customer traffic from CE device 2 destined for CMAC X is sent through the PBB domain via BMAC A1. As long as PBB PE device A1 is active and the link between PBB PE A1 and CE device 1 is active, traffic destined to CMAC X from PBB PE device 8 will be successfully delivered to CE device 1. However, if the link between PBB PE device A1 and CE device 1 fails or PBB PE device A1 itself fails, traffic forwarded from PBB PE device 8 to CE device 1 via PBB PE device A1 will likely be black-holed.

Figure 2B:
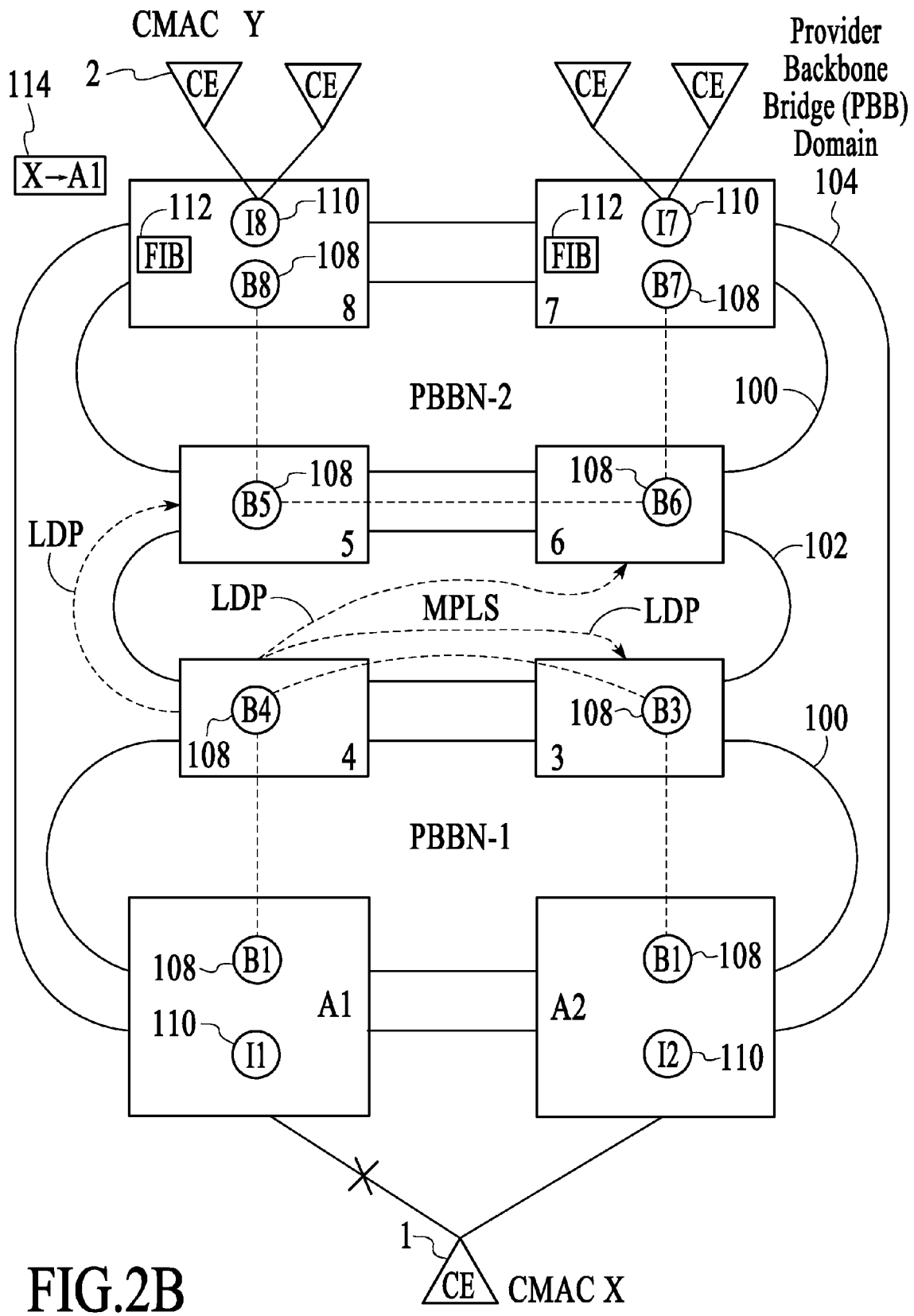

In accordance with another embodiment of the invention, black-holing is controlled by using topology change notification (TCN) messages (e.g., as defined in the Spanning Tree Protocol (STP), IEEE 802.1D or multiple STP (MSTP)) within the PBB domain to trigger flushing and using LDP messages within the MPLS domain to trigger flushing. FIG. 2B depicts the network of FIG. 2A in the case where a service failure occurs in the link between PBB PE device A1 and CE device 1. In response to detecting the failure between PBB PE device A1 and CE device 1, the B-VPLS bridging instance that detects the topology change (e.g., PBB PE device A1) will send a special TCN message towards the root bridge on its root port. In an embodiment, the TCN message includes information specific to triggering CMAC-to-BMAC flushing. Bridges on the path to the root device will keep forwarding the TCN message in the same way until the TCN message reaches the root device. The root device then sets the TCN bit on the Bridge Protocol Data Unit (BPDU) asking for acknowledgement. All bridges along the path of the TCN message will flush their tables (e.g., FIBs, forwarding database (FDB), MAC tables) in response to the TCN message using, for example, fast aging. The bridges will also send acknowledgements towards the root device.

PE devices 3 and 4 receive the TCN message and translate the TCN message to an LDP MAC withdraw message, for example, an LDP empty MAC withdraw message. The LDP MAC withdraw message triggers the flushing of all tables in the B-VPLS PE devices connected within the MPLS domain. PE devices 5 and 6 translate the LDP MAC withdraw messages back to TCN messages and the TCN messages are forwarded to PBB PE devices 7 and 8. PBB PE devices 7 and 8 flush their FIBs, including the CMAC-to-BMAC associations, in response to the TCN messages.

Figure 2C:
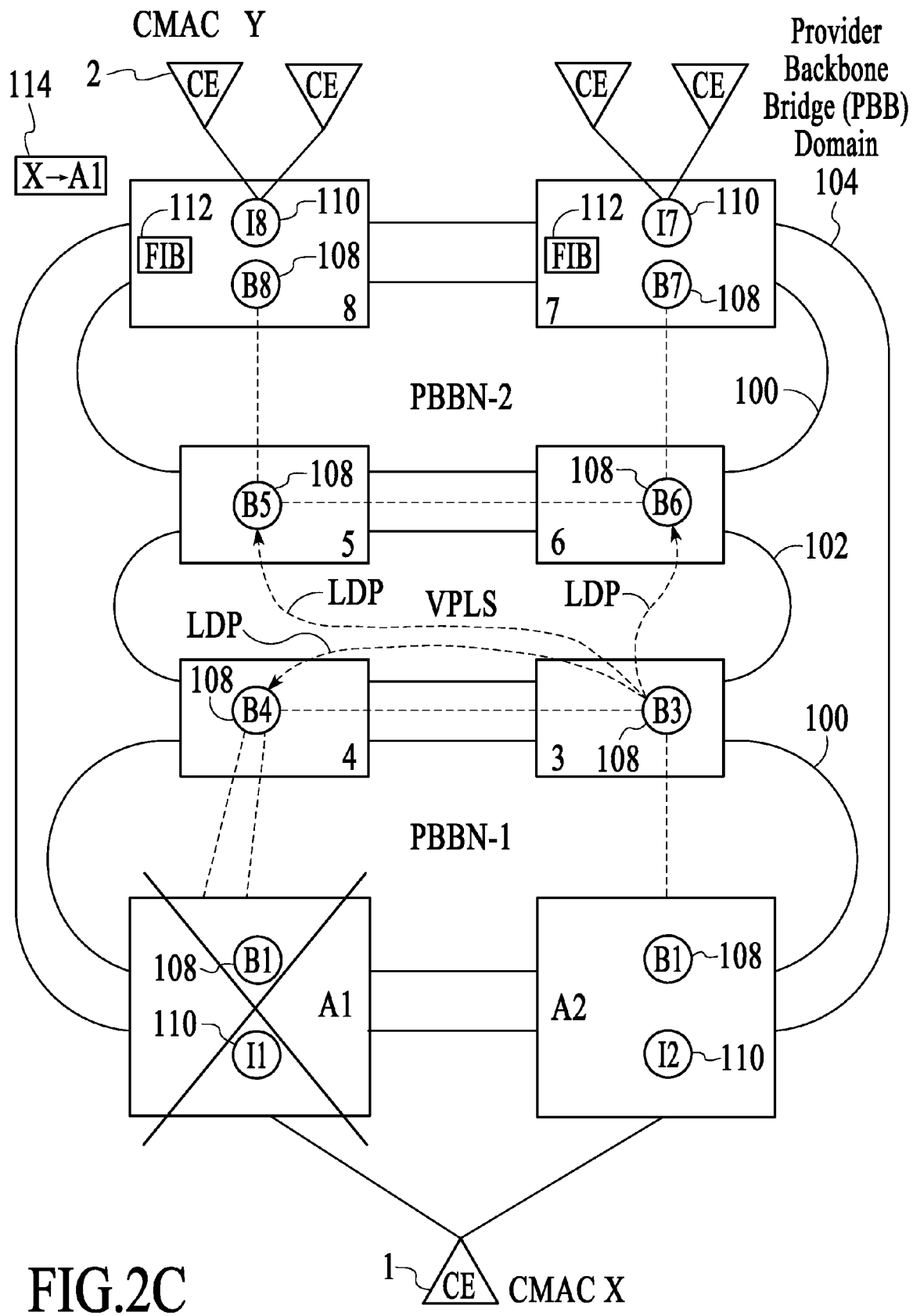

The technique described above with reference to FIG. 2B is also applicable to a PE device failure instead of a link failure. FIG. 2C depicts the network of FIG. 2A in the case where a failure of the entire PBB PE device A1 occurs. When a failure of the PBB PE device A1 occurs, the failure is detected by adjacent nodes. Once an adjacent node detects a failure of the PE device, the adjacent node sends a TCN message to the root device. The root device then sends a TCN message (e.g., a BPDU with the TCN flag set) to all related B-VPLS instances (e.g., part of the same MSTP instance). The TCN message causes the PE devices to flush their FIBs. Nodes that interface between the VPLS and PBB domains will translate the TCN message into an LDP MAC withdraw message. An LDP MAC withdraw message, for example, an LDP empty MAC withdraw message is sent to all devices in the MPLS domain, including devices 5 and 6. Devices 5 and 6 translate the LDP MAC withdraw messages back to TCN messages in the remote PBB domain and the TCN messages are forwarded within the PBB domain according to STP. TCN messages that reach PBB PE devices 7 and 8 cause the PBB PE devices to flush the CMAC-to-BMAC associations from their FIBs.

In an embodiment, a service distribution point (SDP) is a software object to which one or more service and one or more data transport tunnels may be bound. By binding the services to the SDPs, instead of binding the services directly to the transport tunnels, the services can be configured independently of the transport tunnels, and vice versa, thereby simplifying the provisioning and/or reconfiguration of each.

Figure 3:
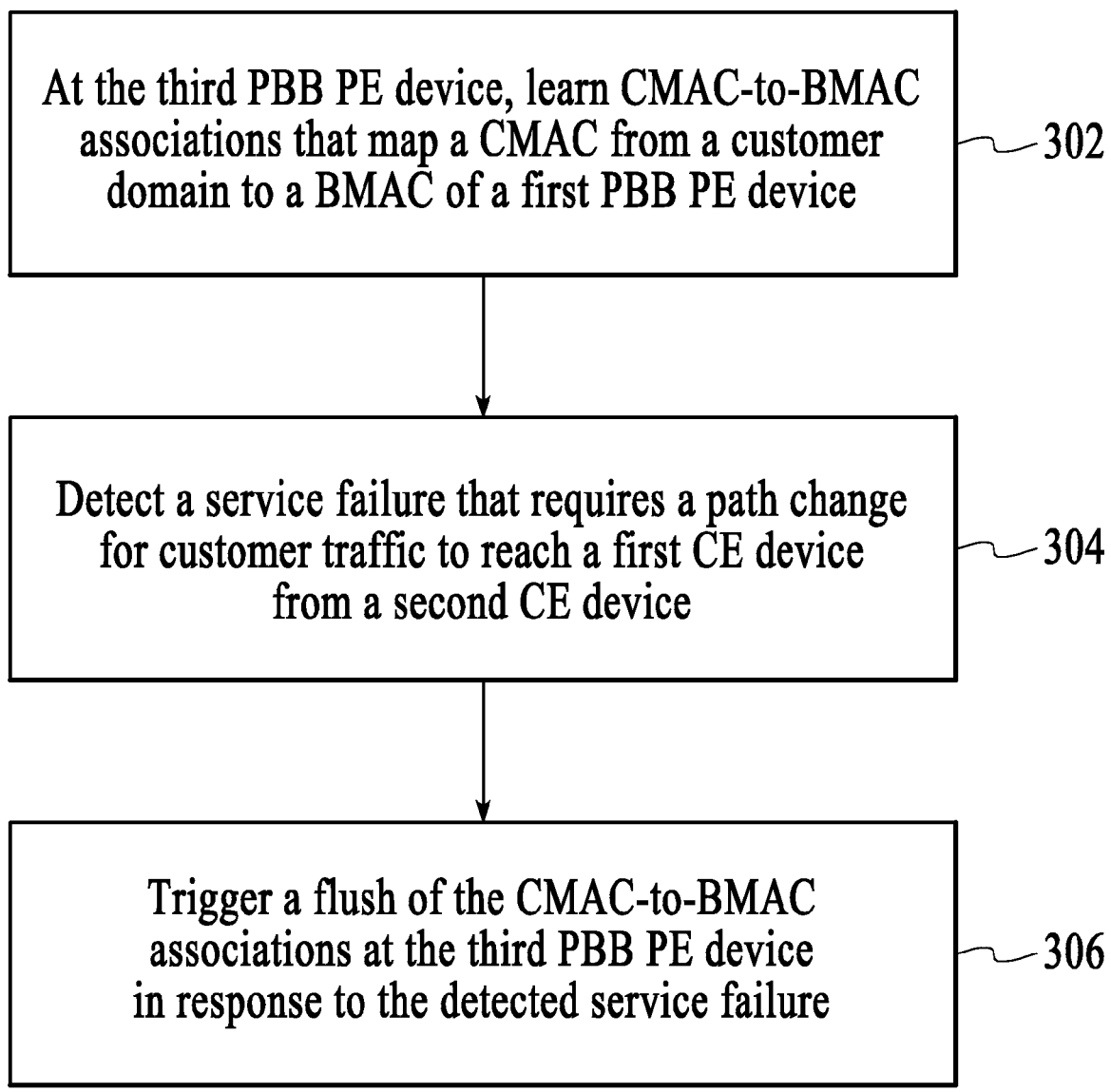
FIG. 3 depicts a process flow diagram of a method for operating a network in accordance with an embodiment of the invention.

FIG. 3 depicts a process flow diagram of a method for operating a network in accordance with an embodiment of the invention. In the embodiment of FIG. 3, the network utilizes PBB to create a PBB domain, wherein the network includes a first CE device connected to first and second PBB PE devices and a second CE device connected to a third PBB PE device. According to the method, at block 302, CMAC-to-BMAC associations that map a CMAC from a customer domain to a BMAC of the first PBB PE device are learned at the third PBB PE device. At block 304, a service failure that requires a path change for customer traffic to reach the first CE device from the second CE device is detected. At block 306, a flush of CMAC-to-BMAC associations is triggered at the third PBB PE device in response to the detected service failure.

Figure 4:
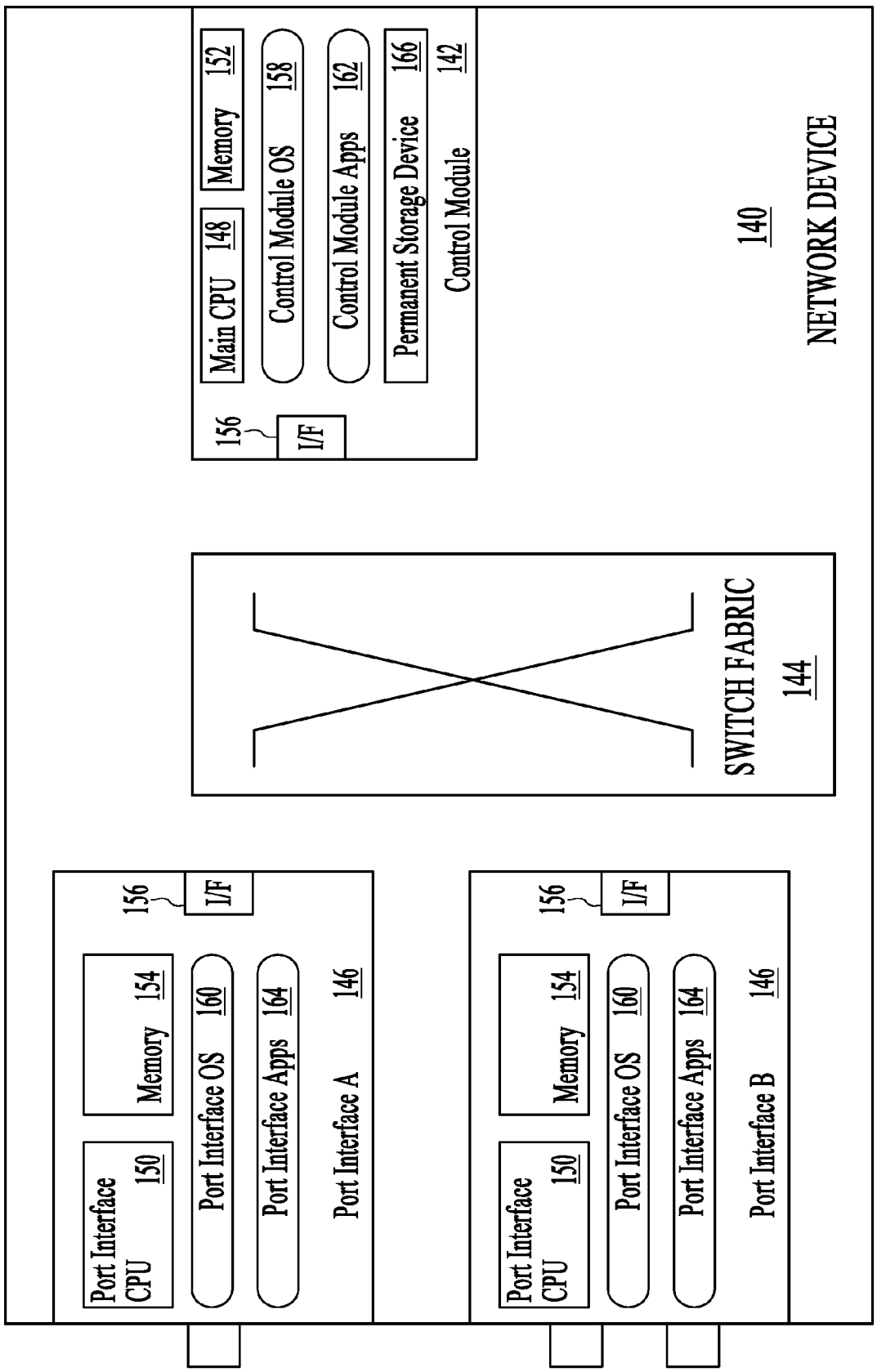
FIG. 4 depicts an exemplary network switching and/or routing device that can function as a PE device and/or a PBB device.

FIG. 4 depicts an exemplary network switching and/or routing device (referred to herein as a network node 140) that includes a control module 142, a switch fabric 144, and two port interface modules 146 (port interfaces A and B). The network node is described as having a distributed architecture because the control module and the two port interfaces each run their own independent operating systems.

The network node 140 handles traffic in discrete segments, often referred to as datagrams. In an embodiment, the network node is an Ethernet switch/router that forwards traffic within the network node using Layer 2 (L2), Layer 3 (L3), and/or Layer 4 (L4) header information, where the network "Layers" are described in the Open System Interconnection (OSI) model as defined by the International Standardization Organization (ISO). The network node may include port interfaces that support network protocols such as Ethernet, asynchronous transfer mode (ATM), synchronous optical network (SONET), and Frame Relay. Although an Ethernet-based switch/router is described, the disclosed techniques for operating a network can be applied to other types of network nodes.

Referring to FIG. 4, the control module 142 of the network node 140 supports various functions such as network management functions and protocol implementation functions. Example functions that are performed by the control module include implementing configuration commands, providing timing control, distributing operating system and application software code, programming hardware tables, providing system information, supporting a user interface, managing hardware changes, and bus management. The switch fabric 144 provides datapaths between the control module and the port interfaces 146 (e.g., control module to port interface datapaths and port interface to port interface datapaths). The switch fabric may include, for example, shared memory, shared bus, and crosspoint matrices. The port interfaces perform functions such as receiving traffic into the network node, buffering traffic, making forwarding decisions, and transmitting traffic from the network node. The port interfaces include one or more ports that support connections to other network nodes.

The control module 142 and port interfaces 146 are independent computer systems that include their own central processing unit (CPU) 148 and 150, memory 152 and 154, interface (I/F) 156, operating system 158 and 160, and applications 162 and 164. The CPU within each independent computer system may include a multifunction processor and/or an application-specific processor. Examples of processors include the PowerPC™ family of processors by IBM and the x86 family of processors by Intel. The memory within the control module may include read only memory (ROM), flash memory, and RAM. The control module includes a large capacity permanent storage device such as a hard disk drive. Because the port interfaces do not include a permanent storage device similar to the control module, their storage capacity is much less than that of the control module.

The interfaces 156 of the control module 142 and port interfaces 146 enable the control module and port interfaces to communicate with each other. In an embodiment, the control module and port interfaces communicate with each other over a backplane (not shown).

The operating systems 158 and 160 of the control module 142 and port interfaces 146 provide a bridge between the CPU, memory, and applications of the respective modules. Examples of operating systems that are used in network nodes with distributed architectures include well-known operating systems such as NetBSD, Linux, and vxWORKS. Although not shown, the CPUs and operating systems may be supported by other hardware (e.g., content addressable memory (CAM) and application-specific integrated circuits (ASICs)).

The applications 162 and 164 that reside on the independent computer systems (i.e., the control module 142 and port interfaces 146) are software-based applications that perform various tasks required of the network node 140. In an embodiment, one of the applications residing on the network node includes an application to implement the above-described technique for providing failure protection in a PBB network using forced MAC flushing. Other exemplary applications that are loaded onto the independent computer systems of the network node include, but are not limited to, L2 protocols, such as L2 Learning, virtual local area network (VLAN) management, spanning tree protocol (STP), and link aggregation control protocol (LACP) and L3 protocols such as open shortest path first (OSPF), border gateway protocol (BGP), intermediate system-to-intermediate system (ISIS), and multiprotocol label switching (MPLS). Although the CPUs 148 and 150, memory 152 and 154, operating systems 158 and 160, and applications 162 and 164 of each module are depicted in FIG. 4 as separate functional units for description purposes, these functional units are operatively and functionally integrated as is known in the field. Additionally, although some examples of CPUs, memory, operating systems, and applications are provided, these examples in no way are meant to be exhaustive lists. In an embodiment, the network node of FIG. 4 is a chassis-based network node in which the control module, switch fabric, and port interfaces are individually removable modules.

While the above-described techniques are described in the general context of network devices such as Ethernet-based switches, bridges, etc., those skilled in the art will recognize that the above-described techniques may be implemented in software, hardware, firmware or any combination thereof. The above-described techniques may also be implemented, for example, by operating a computer system to execute a sequence of machine-readable instructions. The instructions may reside in various types of computer readable media. In this respect, another embodiment of the invention involves a programmed product, comprising computer readable media tangibly embodying a program of machine readable instructions executable by a digital data processor to perform the above-described method. The computer readable media may comprise, for example, RAM (not shown) contained within the PE devices. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Although specific embodiments of the invention have been described and illustrated, the invention is not to be limited to the specific forms or arrangements of parts as described and illustrated herein. The invention is limited only by the claims.

What is claimed is:

1. A method for operating a network that utilizes provider backbone bridging (PBB) to create a PBB domain, wherein the network includes a first customer edge (CE) device connected to first and second PBB provider edge (PE) devices and a second CE device connected to a third PBB PE device, the method comprising:
    at the third PBB PE device, learning customer media access control (CMAC)-to-backbone MAC (BMAC) associations that map a CMAC from a customer domain to a BMAC of the first PBB PE device;
    detecting a service failure that requires a path change for customer traffic to reach the first CE device from the second CE device; and
    triggering a flush of the CMAC-to-BMAC associations at the third PBB PE device in response to the detected service failure.

2. The method of claim 1 further comprising learning new CMAC-to-BMAC associations that map the CMAC from the first CE device to a BMAC of the second PBB PE device.

3. The method of claim 1 wherein triggering a flush of the CMAC-to-BMAC associations comprises using Label Distribution Protocol (LDP) messages.

4. The method of claim 3 wherein using LDP messages comprises establishing a type length value (TLV) element to form an extended LDP MAC withdraw message.

5. The method of claim 4 wherein the TLV element includes one or more BMACs and one or more service instance VLAN IDs (I-SIDs).

6. The method of claim 1 wherein PBB is used in conjunction with a multiprotocol label switching (MPLS) network that connects the PBB PE devices and wherein triggering a flush of the CMAC-to-BMAC association comprises using LDP messages to trigger the flush.

7. The method of claim 1 wherein the network utilizes MPLS end-to-end to connect the PBB PE devices and wherein triggering a flush of the CMAC-to-BMAC associations comprises using LDP messages to trigger the flush.

8. The method of claim 1 wherein triggering a flush of the CMAC-to-BMAC associations comprises using Topology Change Notification (TCN) messages and LDP messages to trigger the flush at the third PBB PE device.

9. The method of claim 1 wherein the network utilizes a combination of PBB and MPLS to connect the PE devices and wherein triggering the flush of the third PBB PE device involves using TCN messages in the PBB network and using LDP messages in the MPLS network.

10. A network device for use in a network that utilizes provider backbone bridging (PBB) to create a PBB domain, wherein the network includes a first customer edge (CE) device connected to first and second PBB provider edge (PE) devices and a second CE device connected to a third PBB PE device, the network device comprising:
    means for detecting a service failure that requires a path change for customer traffic to reach the first CE device from the second CE device; and
    means for triggering a flush of CMAC-to-BMAC associations learned at the third PBB PE device in response to the detected service failure.

11. The network device of claim 10 further comprising means for learning new CMAC-to-BMAC associations that map the CMAC from the first CE device to a BMAC of the second PBB PE device.

12. The network device of claim 10 wherein triggering a flush of the CMAC-to-BMAC associations comprises using Label Distribution Protocol (LDP) messages.

13. The network device of claim 12 wherein using LDP messages comprises establishing a type length value (TLV) element to form an extended LDP MAC withdraw message.

14. The network device of claim 13 wherein the TLV element includes one or more BMACs and one or more service instance VLAN IDs (I-SIDs).

15. The network device of claim 10 wherein PBB is used in conjunction with a multiprotocol label switching (MPLS) network that connects the PBB PE devices and wherein triggering a flush of the CMAC-to-BMAC association comprises using LDP messages to trigger the flush.

16. The network device of claim 10 wherein the network utilizes MPLS end-to-end to connect the PBB PE devices and wherein triggering a flush of the CMAC-to-BMAC associations comprises using LDP messages to trigger the flush.

17. The network device of claim 10 wherein triggering a flush of the CMAC-to-BMAC associations comprises using Topology Change Notification (TCN) messages and LDP messages to trigger the flush at the third PBB PE device.

18. A non-transitory computer readable storage medium comprising program instructions for operating a network that utilizes provider backbone bridging (PBB) to create a PBB domain, wherein the network includes a first customer edge (CE) device connected to first and second PBB provider edge (PE) devices and a second CE device connected to a third PBB PE device, the program instructions implementing the steps of:
- at the third PBB PE device, learning customer media access control (CMAC)-to-backbone MAC (BMAC) associations that map a CMAC from a customer domain to a BMAC of the first PBB PE device;
- detecting a service failure that requires a path change for customer traffic to reach the first CE device from the second CE device;
- triggering a flush of the CMAC-to-BMAC associations at the third PBB PE device in response to the detected service failure; and
- learning new CMAC-to-BMAC associations that map the CMAC from the first CE device to a BMAC of the second PBB PE device.

19. The non-transitory computer readable storage medium of claim 18 wherein triggering a flush of the CMAC-to-BMAC associations comprises using Label Distribution Protocol (LDP) messages.

20. The non-transitory computer readable storage medium of claim 18 wherein triggering a flush of the CMAC-to-BMAC associations comprises using Topology Change Notification (TCN) messages and LDP messages to trigger the flush at the third PBB PE device.

* * * * *